Sept. 12, 1967  A. E. AHLSTRÖM  3,340,651
APPARATUS FOR GRINDING DRILLS
Filed Dec. 7, 1964  3 Sheets-Sheet 1

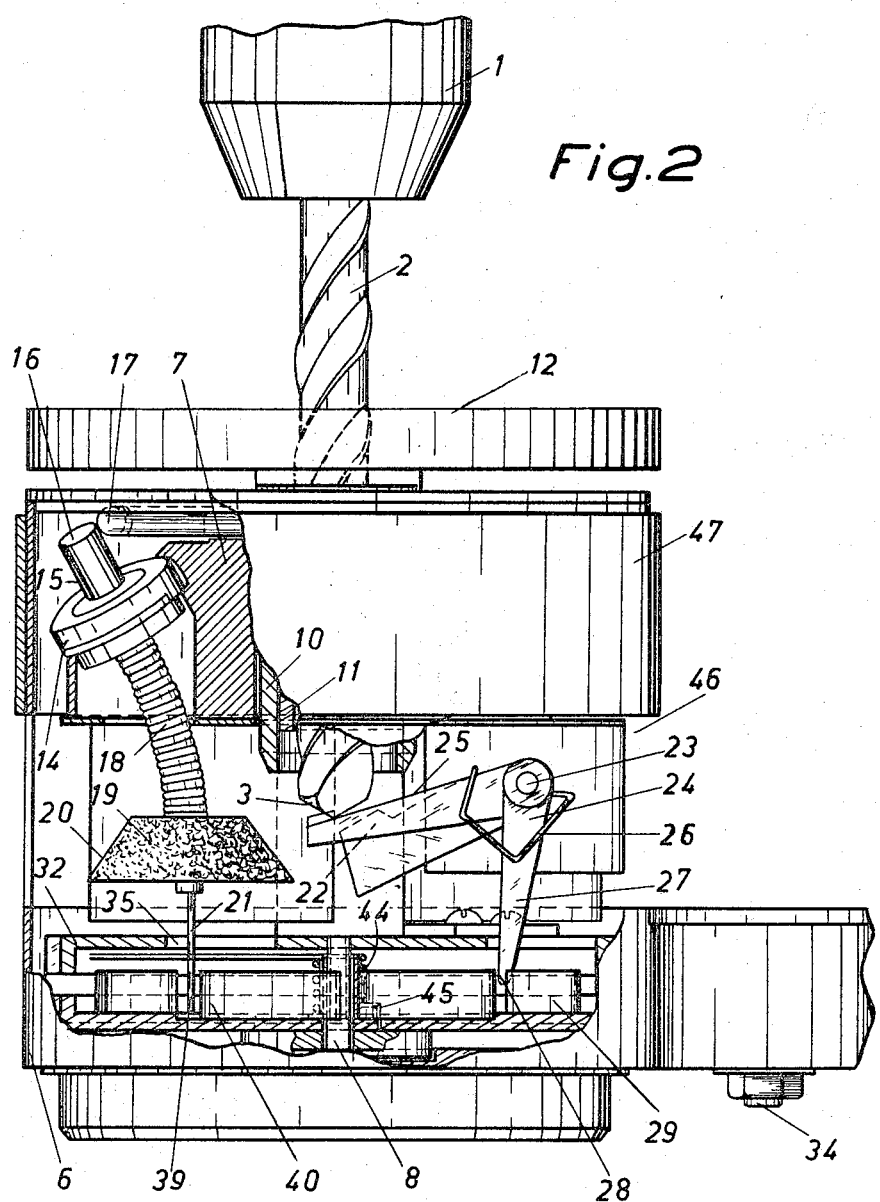

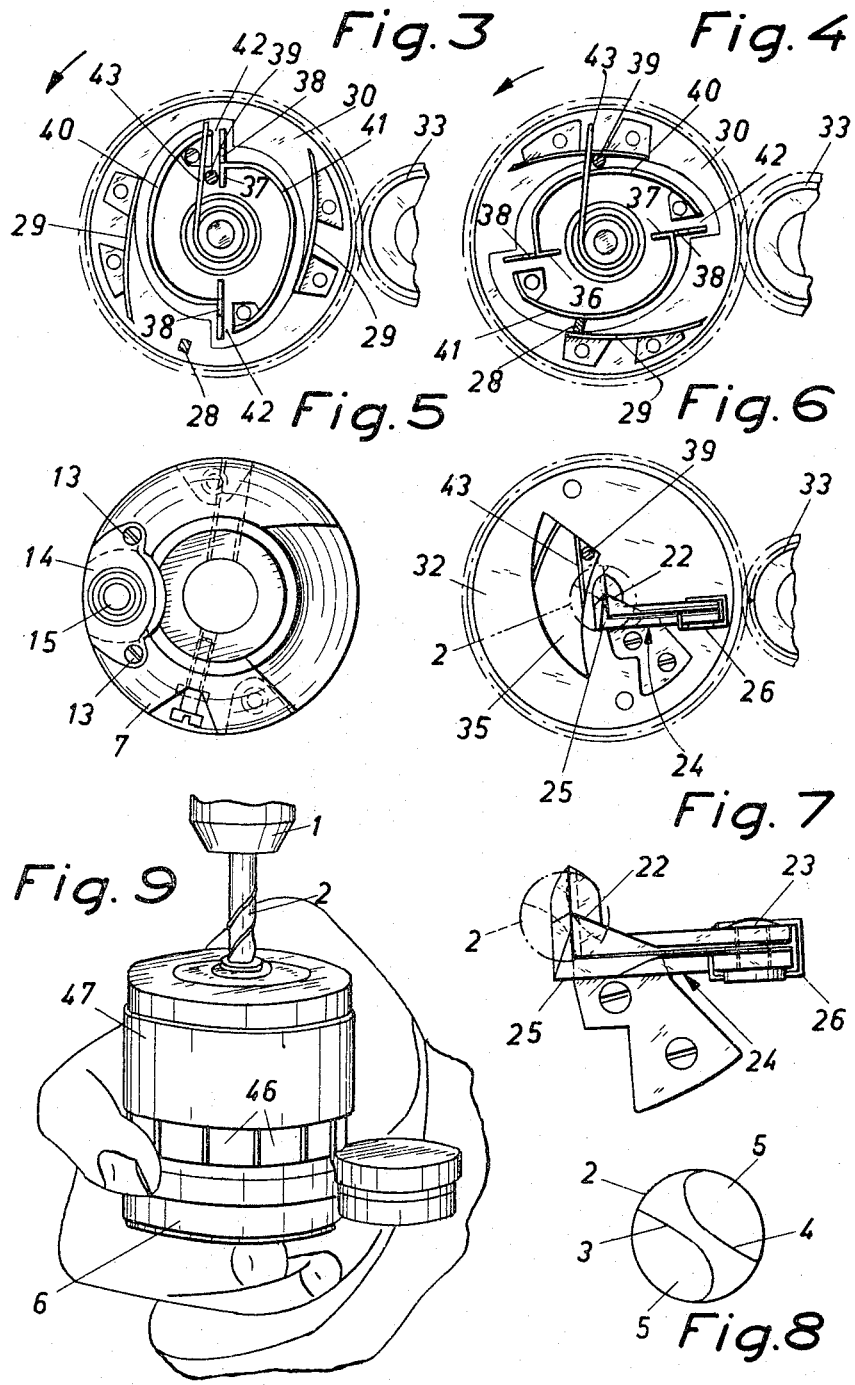

United States Patent Office 3,340,651
Patented Sept. 12, 1967

3,340,651
APPARATUS FOR GRINDING DRILLS
Allan Eugen Ahlström, Norra Vagen 11,
Halmstad, Sweden
Filed Dec. 7, 1964, Ser. No. 416,208
Claims priority, application Sweden, Dec. 6, 1963,
13,547/63
7 Claims. (Cl. 51—33)

ABSTRACT OF THE DISCLOSURE

A hand-held grinder for twist drills powered by rotation of the drill wherein an abutment engages in the end of a chip flute to cause major portion of the mechanism to turn about the drill axis. Only one grinding stone is used and cam means are provided to periodically disengage the abutment from one flute and then engage it in the other, with the grinding stone being swung in timed relationship for grinding the lips successively with clearance.

Figure 1:
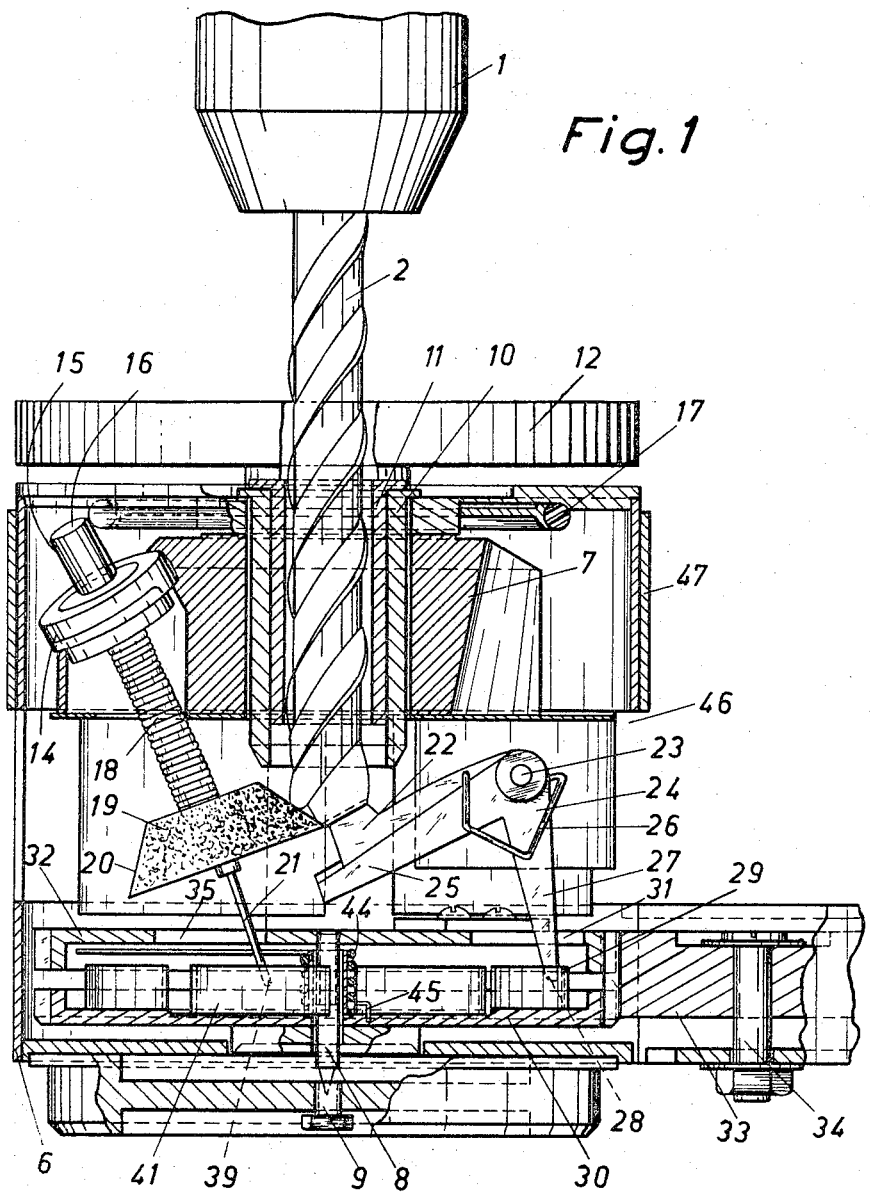

This invention has reference to an apparatus for grinding drills, in particular twist drills, said apparatus being provided with a grinding disk and preferably being clampable, to the drill to be ground, said drill clamped, e.g., in the chuck of the spindle in a drilling machine.

The grinding apparatus is provided with devices for driving said grinding disk by means of the rotation of the drill with said disk in contact with the operative end of the drill. The apparatus is shaped in such a way that it can be held manually during the grinding.

The main feature of the invention is that the shape of the grinding disk is adapted, during the rotation of the same, to cause a variation in the inclination of the grinding disk to force the disk, during the rotation, to change its abutment against the operative end of the drill and thus to cause a clearance behind the cutting edge of the drills being actually ground. By means of such an apparatus it is possible to grind easily and quickly a drill clamped in the chuck of a drilling machine or the like and simultaneously to obtain the required clearance of the drill cutting edges for obtaining a good drilling operation. Thus, there is no need for removing the drill from the chuck for its grinding. The grinding apparatus does not have to be provided with more than one grinding disk which is brought to alternating contact with the drill during the grinding.

In the following, the invention will be elucidated with reference to the accompany drawings. In the drawings:

FIG. 1 shows a vertical longitudinal section through the grinding apparatus according to the invention, this view showing the grinding disk during the grinding, FIG. 2 shows a similar section with the grinding disk swung away and the drill out of contact with a driving abutment on the apparatus, FIG. 3 is a plan view of a cam of the apparatus in a position corresponding to the position of the grinding disk shown in FIG. 1, FIG. 4 is a similar view of the cam in the position corresponding to FIG. 2, FIG. 5 is a plan view of the inner driven body of the apparatus, FIG. 6 is a plan view of a means in the apparatus for driving the body by means of the rotation of the drill and of a means for causing a temporary minor axial displacement of the body in relation to the drill in the direction away from the same, FIG. 7 shows on an enlarged scale the driving means and displacement means of FIG. 6, FIG. 8 is a plan view of the operative end of the drill, and FIG. 9 shows in perspective obliquely from above how the apparatus is to be held by one hand during the grinding.

Reference numeral 1 denotes a chuck of a drill machine (not shown) for clamping a twist drill 2. The operative end of said drill is provided with two cutting edges 3, 4 (FIG. 8) and two chip channels 5 extending helically.

The main portions of the grinding apparatus comprise a holder 6 shaped as a cover to be kept by one hand during the grinding and a body 7 carried for rotation interiorly of said holder and for rotation in relation to the same. For bearingly mounting the body 7 relative to the holder 6, there is a hub 10 at its upper end and a pointed thrust tenon stub shaft 8 on the lower end of the body, which lower end is a toothed disc or gear 32, later described. Then tenon 8 is received in a guiding sleeve 9 in the lower portion of the holder. A sleeve 11 can be rotated in relation to said hub 10 and this sleeve comprises a part of a clamping chuck 12 by means of which the grinding apparatus can be fixed about the drill 2 with an exact axial centering in relation to the same. On the body 7 there is, by means of two screws 13, 13 (FIG. 5), attached a bearing 14 for a shaft 15 enclosing an acute angle with the longitudinal axis of the grinding apparatus. The upper end 16 of the shafts abuts against a stationary friction ring 17 preferably comprising hard rubber or a similar somewhat resilient material and being arranged on the holder 6. Thus, upon the rotation of the body 7 the shaft is brought to rotate with a speed which considerably exceeds the rotation speed of the drill 2 and corresponds to the ratio between the diameter of the friction ring 17 and the diameter of the shaft end 16. Below the bearing 14 the shaft 15 continues in a flexible shaft 18 of closely spun steel wires, the lower end of said shaft 18 carrying on its lower end a grinding disk 19 with a conical mantel or side surface 20. Below the grinding disk 19 the shaft 18 is provided with an extension portion 21.

The body 7 is provided with a driving abutment 22 adapted to engage one of the chip channels of the drill 2 and upon the rotation of the drill to serve as a driver for bringing the body 7 to rotate with the same speed as the drill.

On the body 7 there is further about a horizontal shaft 23 carried a two-armed angle lever 24 one arm 25 of which is adapted upon the swinging of the lever against the action of a spring 26 in clockwise direction according to FIGS. 1 and 3 to abut against the operative end of the drill and thereby to cause a displacement in forward direction of the body 7 in relation to the drill 2 in such a way that the driving abutment 22 is momentarily brought out of engagement with the actual chip channel 5. This swinging of the lever 24 is rendered possible thereby in that one end 28 of the other lever 27 is influenced temporarily by the arched walls 29 of a cam 30 in the shape of a sprocket. The arm 27 extends through an opening 31 above it in a disk 32 connected to the driven body 7 and provided with a gear ring. The disks 30, 32—of which the upper disk 32 has a somewhat greater number of teeth than the lower disk 30 journalled about the abutment 8—engages with their teeth a common sprocket 33 journalled in the holder cover 6 about a shaft 34 parallel with the longitudinal axis of the grinding apparatus. The upper disk has, e.g., about 160 teeth while the lower cam 30 has about 135 teeth. Due to the fact that the disks 30, 32 have different numbers of teeth and cooperate with a common sprocket 33, the cam 30 will during the rotation of the body 7 rotate slowly in relation to said body 7 about the tenon 8. This slow relation rotation is according to the invention taken advantage of so as to bend the shaft 18 at certain time intervals and to force the disk 19 during its rotation to be brought out of and into contact with the operative end of the drill 2 and simultaneously to tilt the grinding disk in such a way that not only the cutting edge 3 or 4, respectively, are ground but also that a clearance is formed behind the cutting edge, said clearance being necessary for the drilling operation with the drill 2. This starting and pendulous movement of the flexible shaft 18 has as a result that the elongation portion 21 extending through a port 35 in the cam 32 and down to the cam 30 where the lower end 39 of the elongation portion 21 is guided by driving plates 36, 37 and passages 38 in the same as well as upwardly directed arched walls 40, 41 having guiding channels 42 situated between them. For the guidance of the end 39 of the elongation portion 21 also serves one free end 43 of a helical spring 44 laid about the abutment tenon 8, the other end 45 of said spring 44 attached to the lower cam 30.

When the rotating drill 2 clamped in the chuck 1 is to be ground, the driving apparatus according to the invention is put from below on to the drill whereas the clamping chuck centers the grinding apparatus in relation to the drill. When the driving abutment 22 on the body 7 engages one of the chip channels 5 and, e.g., the cutting edge 4 is brought to abutment against the driver 22, the body and the details on the same are brought to rotate with the drill 2. When thereby the shaft end 16 is moved in friction contact with the friction ring 17 the shaft with the grinding disk 19 is caused to rotate with a high speed. By means of the slow rotation of the cam 30 about the tenon 8 said rotation caused by means of the above recited cooperation between the disk 32 rotating together with the body 7 and the sprocket 33 and by the abutment of the end 39 of the elongation portion 21 against the outside of one or the other of the arched walls 40, 41, there is obtained the required bending of the shaft 18 to render possible the desired grinding of the drill 2.

The grinding operation will be elucidated in the following, starting from the place where the grinding disk 19 is swung away from the drill 2 (FIG. 2) due to the abutment of the elongation portion end 39 against the outside of the arched wall 40 (FIG. 4). When thereupon the cam 30 is rotated in the direction of the arrow in FIG. 4 until the guiding channel 42 at the rear end (the right-hand end according to FIG. 4) of the wall 40 reaches the elongation portion end 39, this end snaps radially into this guiding channel due to the resiliency of the shaft 18, whereas the grinding disk 19 with its conical mantel surface is brought to abutment against the operative end of the drill in front of the cutting edge 3 which due to the quick rotation of the grinding disk then will be ground. Upon the continued rotation of the cam 30 in the direction of the arrow the driving plate 37 which presses against the elongation portion end 39 swings the grinding disk 19 in counter-clockwise direction according to FIG. 3 while tilting the disk in such a way that the operative end of the drill behind the cutting edge 3 is ground to such an extent and with such an inclination angle that the required clearance is obtained. At this swinging away of the elongation portion end 39 also the end 43 is brought along by the spring 44 which is stretched to such an extent that at a certain predetermined position of the grinding disk the end 39 is lifted out of the passage 38 and then slides on the outside of the arched wall 41. The shaft is then again bent outwards and brings the grinding disk out of contact with the drill 2. The cam 30 has now been turned so far that one of the walls 29 by pressing against the arm end 28 has swung the angle lever 24 in clockwise direction according to FIGS. 1 and 2. At the end of this turning movement the outer end of the arm 25 abuts against the operative end of the drill 2 (FIG. 2). There is then obtained an axial relative (mutual) displacement between the body 7 and the drill 2 (the body 7 is moved somewhat downwards according to FIGS. 1 and 2) which means that the drill 2 for a short movement is allowed to be turned in relation to the body 7. When simultaneously the contact between the actual arched wall 29 (the lower wall according to FIG. 4) and the arm end 28 ceases, there is obtained by means of a light pressing upwards of the cover 6 a renewed engagement between the drill 2 and the driving abutment 22 of the body 7 but this time in the opposite chip channel 5 and now in abutment against the cutting edge 3. Thereupon the above described course of events is repeated but this time with the cutting edge 4 which, thus, is ground in the same manner as the cutting edge 3.

The shown and described embodiment is to be regarded only as an example and the different details of the grinding apparatus may be constructively modified in many ways within the scope of the appended claims. In the aforegoing the apparatus has been described as provided with only one grinding disk 19.

The grinding operation does not have to be performed vertically but can be performed, e.g., horizontally. The cover 6 outside the body 7 is in front of the grinding disk 19 provided with two openings 46 to allow the removal of chips. These openings may be closed more or less as desired by means of a sleeve 47 axially slidable on the cover 6.

What I claim is:

1. A grinder for sharpening twist drills comprising an essentially stationary housing to receive an end portion of a drill therein, a body in the housing for surrounding said end portion and mounted for rotation about an axis; means for substantially holding in alinement the axes of the drill and body so that the body may rotate substantially about the drill, a distortable rotary grinder shaft mounted on the body for gyration about said axis and having an end portion axially fixed relative to the body, means on the housing for imparting rotation to the shaft at said end portion thereof when the latter gyrates, an abutment element carried on the body and movable with the body into and out of engagement position with the end of the drill at one chip channel thereof and for rotating the body when the drill rotates and the element is in engagement, a frusto-conical grinding wheel carried on the other end portion of the grinder shaft for engagement by the outer side surface thereof with the end of the drill in generally line contact, on the side of the drill opposite the abutment element, a cam member mounted for rotation about the axis of the body and having gearing with the latter for reducing the speed of the cam member relative to that of the body, and means on said other end portion of the grinder shaft for engaging the cam member for periodically swinging the grinding wheel away from the axis of the drill and changing the zone of contact on the drill for grinding clearance behind the cutting edge of the drill.

2. A grinder as claimed in claim 1 said grinder shaft being flexible, and resilient, at least the major portion of its length and the change of the zone of contact including a change in the angle between the grinder wheel and drill axes.

3. A grinder as claimed in claim 2, and means carried on the body and engageable with the cam member for moving the body axially relative to the drill and to disengage the abutment element from the drill.

4. A grinder as claimed in claim 2, and means for momentarily disengaging the abutment element from the drill by rotation of the body during subjection of the housing to urging of the grinder onto the drill to allow the abutment element to slip from one channel to the other and for the drill to make half a turn relative to the body and present the other side of the drill end to the grinding wheel.

5. A grinder as claimed in claim 3 said means for moving the body being a right angled lever having one arm thereof carrying the abutment element and the other arm engageable with the cam member.

6. A grinder as claimed in claim 2, said means on the other end of the shaft being substantially a slender extension of the shaft and said cam member including a pair of arched cam walls nearly 180° between like ends, one end of each arm wall having thereat an essentially radial plate for defining a side of a generally radial passage between the walls, the free end of said extension engaging the outer faces of said cam walls when the grinder wheel is away from the drill, the shape of the cam walls being such that rotation of the cam member swings the shaft and grinding wheel to extreme outer position from the drill until the passage reaches said free end and then resilency of the flexible shaft throws the wheel to the drill along the passage.

7. A grinder as claimed in claim 6 and generally radial resilient means extending from the cam member axis for engaging said extension for enabling the free end to jump the radial plate after the cam member has turned a predetermined distance relative to the turning of the body.

References Cited

UNITED STATES PATENTS

| | | | |
|---|---|---|---|
| 2,017,532 | 10/1935 | Elter et al. | 51—219 X |
| 2,177,644 | 10/1939 | Finke | 51—120 |
| 3,135,074 | 6/1964 | Fink | 51—241 |
| 3,224,146 | 12/1965 | Ahlstrom | 51—219 X |

LESTER M. SWINGLE, *Primary Examiner.*